US012612159B2

(12) United States Patent
Newman

(10) Patent No.: US 12,612,159 B2
(45) Date of Patent: Apr. 28, 2026

(54) EVTOL AIRCRAFT

(71) Applicant: Glen Newman, Jacksonville, FL (US)

(72) Inventor: Glen Newman, Jacksonville, FL (US)

( * ) Notice: Subject to any disclaimer, the term of this patent is extended or adjusted under 35 U.S.C. 154(b) by 151 days.

(21) Appl. No.: 18/728,424

(22) PCT Filed: Jan. 11, 2022

(86) PCT No.: PCT/US2022/012061
§ 371 (c)(1),
(2) Date: Jul. 11, 2024

(87) PCT Pub. No.: WO2023/136815
PCT Pub. Date: Jul. 20, 2023

(65) Prior Publication Data
US 2025/0083809 A1    Mar. 13, 2025

(51) Int. Cl.
B64C 29/02 (2006.01)
B64C 17/00 (2006.01)
(Continued)

(52) U.S. Cl.
CPC .............. B64C 29/02 (2013.01); B64C 17/00 (2013.01); B64C 25/40 (2013.01); B64C 27/22 (2013.01);
(Continued)

(58) Field of Classification Search
CPC ......... B64C 29/02; B64C 25/40; B64C 27/22; B64D 27/31
(Continued)

(56) References Cited

U.S. PATENT DOCUMENTS

| 2,681,776 A | 6/1954 | Howard |
| 12,091,149 B2 * | 9/2024 | Abbott ................... B64U 20/40 |

(Continued)

FOREIGN PATENT DOCUMENTS

| BR | 112023025636 B1 * | 7/2025 |
| CA | 2315524 A1 * | 5/2001 ............. B64D 27/31 |

(Continued)

OTHER PUBLICATIONS

International Search Report and Written Opinion, Mailed Mar. 29, 2022, In Related PCT App No. PCT/US22/012061, 12 PAGES.
(Continued)

*Primary Examiner* — Christopher P Ellis
(74) *Attorney, Agent, or Firm* — Law Office of Jeff Williams PLLC; J. Oliver Williams

(57) ABSTRACT

An electric vertical take-off and landing vehicle includes a fuselage containing an internal compartment which may be used to transport a person, animal, or object. The fuselage includes a canard located at a forward portion of the fuselage in front of the internal compartment. A pair of wings extend outward from the fuselage wherein each of the pair of wings contains a propulsion unit configured to provide thrust. It is desired that each propulsion unit is in fixed orientation to the fuselage and the pair of wings. A landing foot is also included and configured to rotate the fuselage into and out of a vertical orientation when on the ground. The internal compartment of the fuselage is configured to rotate to maintain an upright orientation as the fuselage is at its various orientations.

18 Claims, 12 Drawing Sheets

(51) Int. Cl.

| | |
|---|---|
| *B64C 25/40* | (2006.01) |
| *B64C 27/22* | (2006.01) |
| *B64D 27/34* | (2024.01) |
| *B64C 25/32* | (2006.01) |

(52) U.S. Cl.
CPC ........ *B64D 27/34* (2024.01); *B64C 2025/325* (2013.01)

(58) Field of Classification Search
USPC ......................................................... 244/7 B
See application file for complete search history.

(56) References Cited

U.S. PATENT DOCUMENTS

| | | | | |
|---|---|---|---|---|
| 12,448,142 | B1 * | 10/2025 | Edens .................... | B64D 27/31 |
| 2016/0144957 | A1 | 5/2016 | Claridge et al. | |
| 2019/0176981 | A1 | 6/2019 | Gaillimore et al. | |
| 2021/0016877 | A1 | 1/2021 | Hohenthal | |
| 2021/0245874 | A1 * | 8/2021 | Evulet ................. | B64C 29/0025 |
| 2021/0284333 | A1 * | 9/2021 | Windisch ............ | B64C 29/0066 |

FOREIGN PATENT DOCUMENTS

| | | | | |
|---|---|---|---|---|
| CN | 106864746 | A | 6/2017 | |
| CN | 112027080 | A | 12/2020 | |
| EP | 4105125 | A1 * | 12/2022 ............. | B64U 50/11 |
| EP | 4279390 | A1 * | 11/2023 ......... | B64C 29/0016 |
| WO | WO-2022086321 | A1 * | 4/2022 ............ | B64D 27/34 |
| WO | WO-2024166037 | A2 * | 8/2024 ............ | B64C 39/10 |

OTHER PUBLICATIONS

International Preliminary Report On Patentability, Mailed Mar. 14, 2024, In Related PCT App No. PCT/US22/012061, 10 PAGES.

* cited by examiner

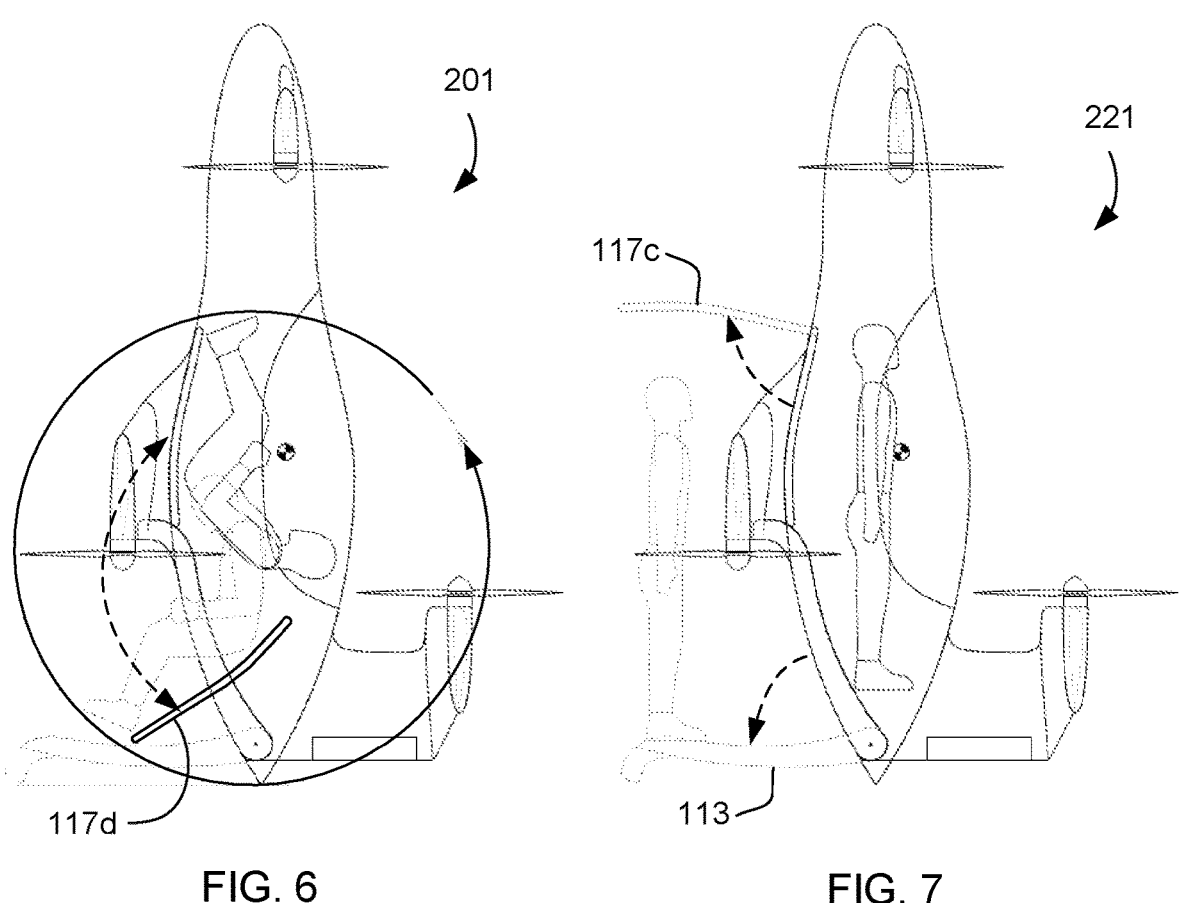
FIG. 6                              FIG. 7
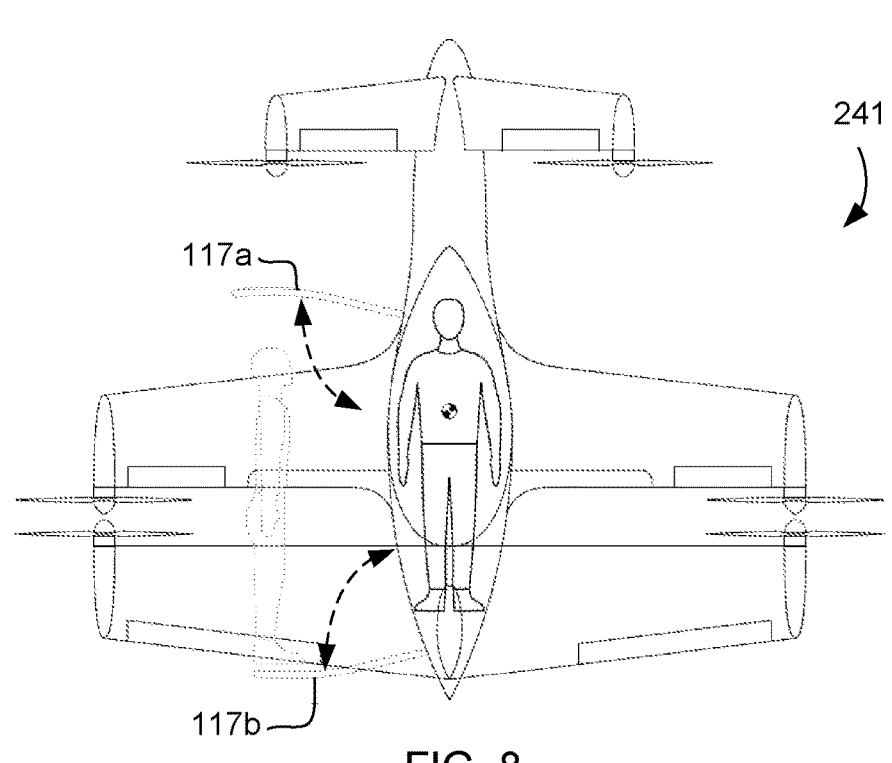
FIG. 8

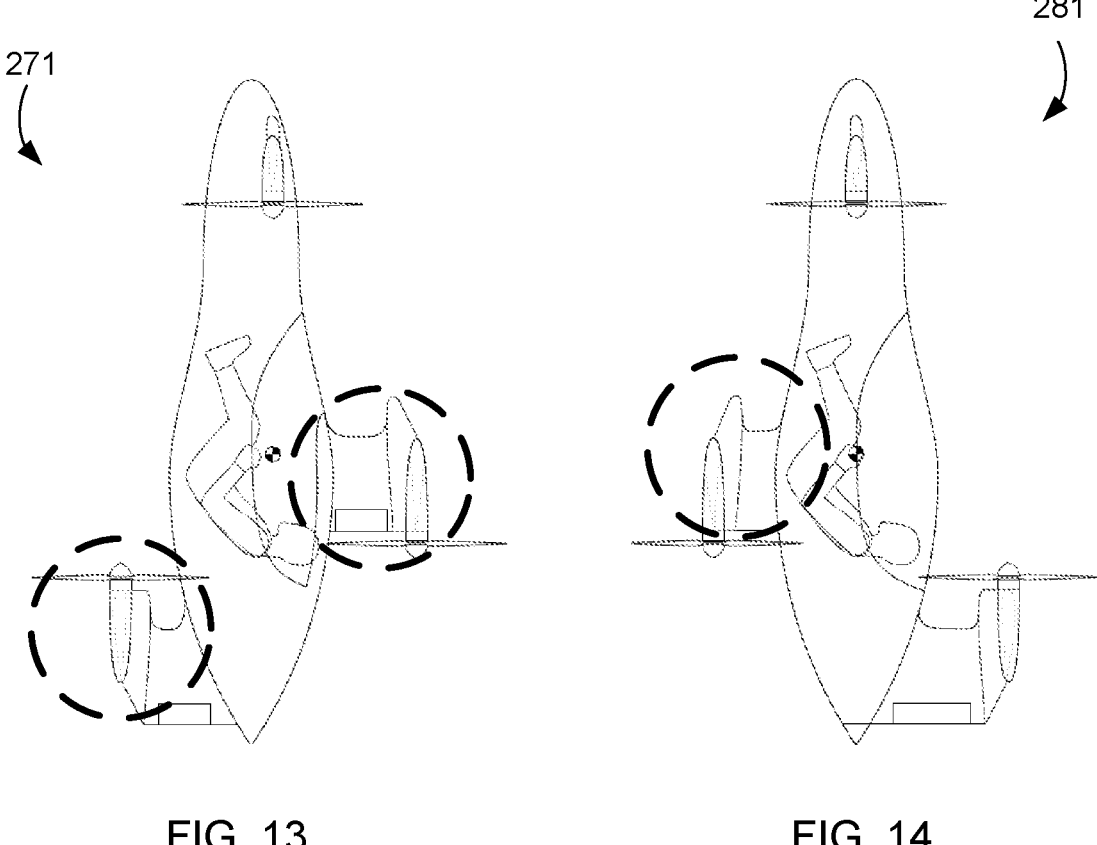
FIG. 13                          FIG. 14
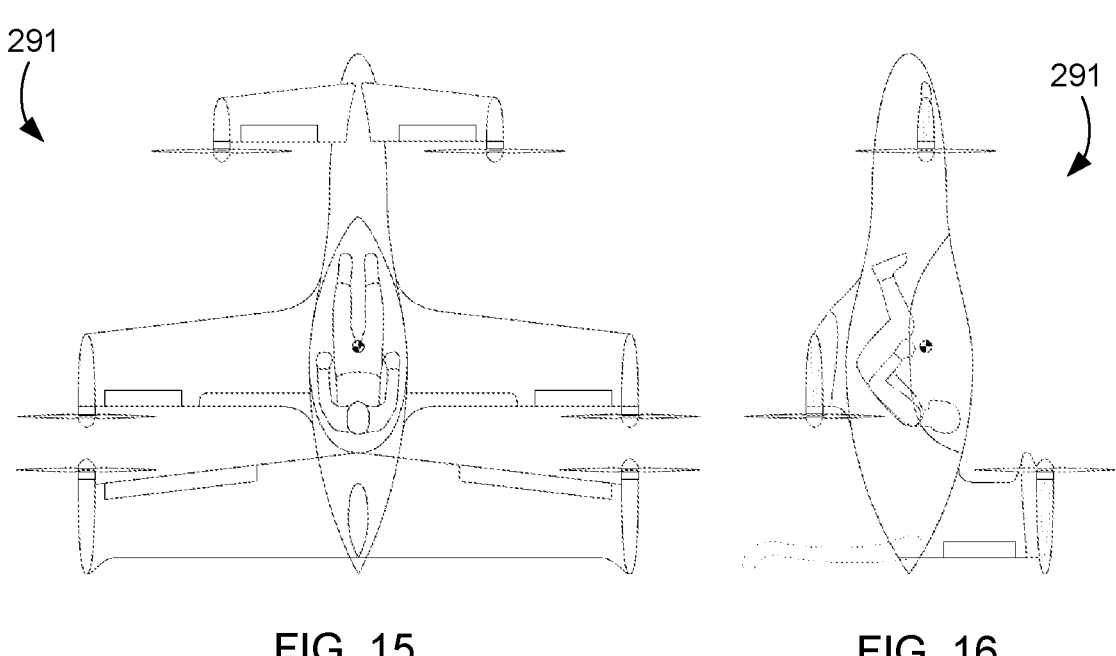
FIG. 15                          FIG. 16

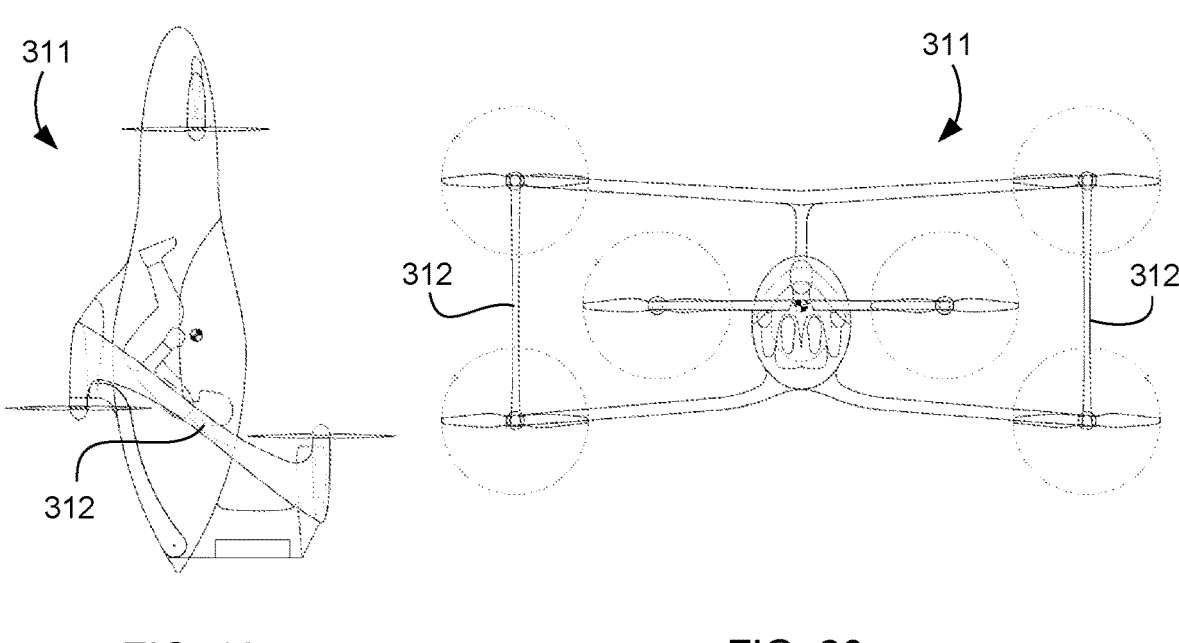
FIG. 19                              FIG. 20
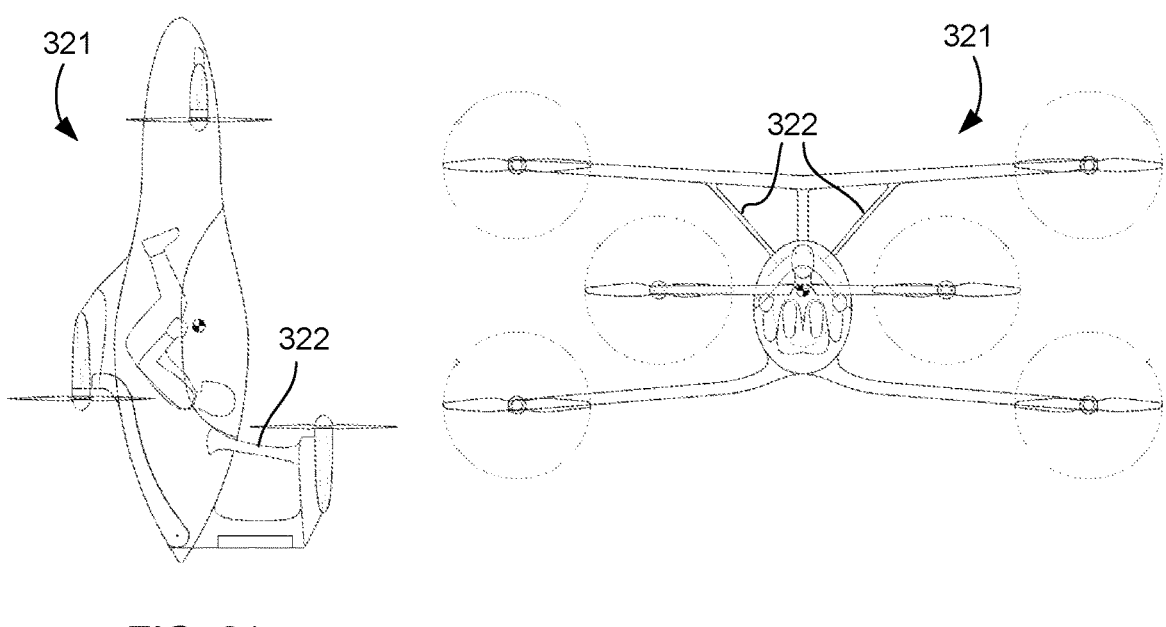
FIG. 21                              FIG. 22

331

111a

331

111a

341

111b

341

111b

361

EVTOL AIRCRAFT

TECHNICAL FIELD

The present application relates generally to aircraft, and in particular to electric vertical take-off and landing (EVTOL) aircraft.

DESCRIPTION OF THE PRIOR ART

Vertical take-off and landing aircraft are known in the industry. These can take many forms including wing type forms and helicopter forms. A unique characteristic with these aircraft are the ability to take-off at or near vertically. This is done with articulation of the propulsion systems either on their own with respect to the wings and fuselage, or in combination with the wings relative to the fuselage. This adds great complexity to the design and engineering constraints.

Although great strides have been made with respect to VTOL aircraft, considerable shortcomings remain.

SUMMARY OF THE INVENTION

It is an object of the present application to provide an electric vertical take-off and landing vehicle (EVTOL) capable of transporting a single person and/or cargo within an internal compartment, between two locations. It is considered feasible to achieve a distance of travel of 100 miles at a speed of 150 mph for example. Furthermore, it is an object of the present application to provide the aircraft with the ability to land on a standard roadway lane (10 ft wd) and be transported by a lowboy trailer without disassembly (12 ft ht).

To avoid complexity, an object of the present application is to operate without the need for articulation of the propulsion units. It is desired to achieve no or minimal articulation of propulsion units in order to minimize complexity and cost while maximizing safety. In operation the aircraft will land vertically, in a perpendicular orientation to the landing surface and have the ability to thereafter transition or rotate between the vertical orientation and a horizontal orientation when in contact with the landing surface. The internal compartment is accessible, or able to open, in both orientations as needed. In flight, the aircraft is configured to have a stable hover capability to assist in navigating crowded areas, such as cities, trees, poles, and so forth. In forward flight the fuselage is streamlined to have a minimal volume. The minimization of non lift extensions coupled with reactive computer controlled propulsion enable stable and efficient horizontal flight.

The more important features of the assembly have thus been outlined in order that the more detailed description that follows may be better understood and to ensure that the present contribution to the art is appreciated. Additional features of the system will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present assembly. It is important, therefore, that the claims be regarded as including such equivalent constructions insofar as they do not depart from the spirit and scope of the present assembly.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 6 is a side view of the EVTOL aircraft of FIG. 1 including a pivoting seat.

FIG. 7 is a side view of the EVTOL aircraft of FIGS. 1-4 with an auxiliary door.

FIG. 8 is a top view of the EVTOL aircraft of FIG. 6 with the auxiliary door opening to the side.

FIGS. 13-31 are side and top views of the EVTOL aircraft of FIGS. 1-4 with different wing configurations and aircraft characteristics.

Figures 1, 2:
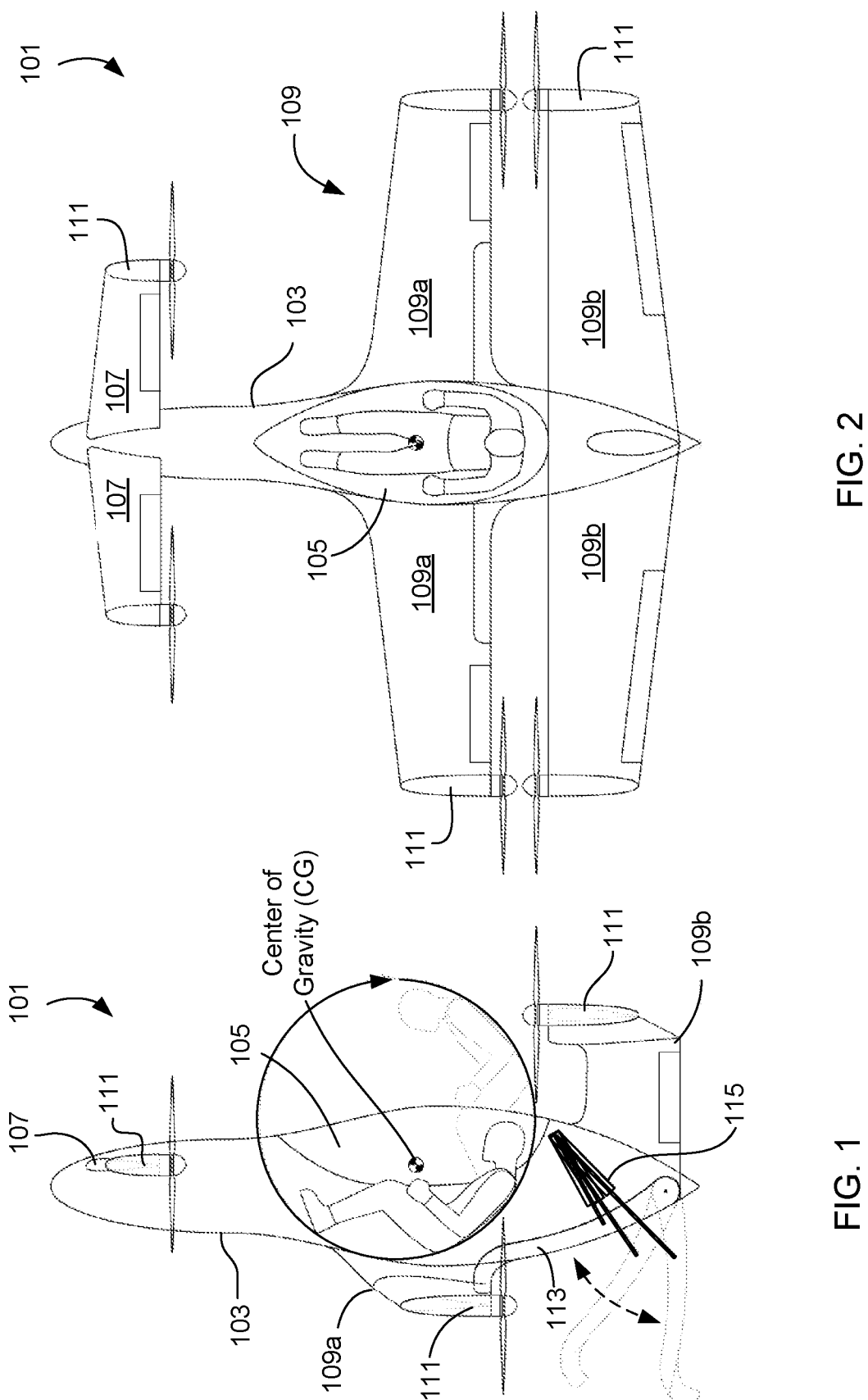
FIG. 1 is a side view of an EVTOL aircraft in a vertical orientation according to an embodiment of the present application.
FIG. 2 is a top view of the EVTOL aircraft of FIG. 1.

While the assembly of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly in accordance with the present application overcomes one or more of the above-discussed problems commonly associated with conventional vertical take-off and landing aircraft discussed previously. In particular, the EVTOL of the present application includes a fuselage containing an internal compartment which may be used to transport a person, animal, or object. The fuselage includes a canard located at a forward portion of the fuselage in front of the internal compartment. A pair of wings extend outward from the fuselage wherein each of the pair of wings contains a propulsion unit configured to provide thrust. It is desired that each propulsion unit is in fixed orientation to the fuselage and the pair of wings. A landing foot is also included and configured to rotate the fuselage into and out of a vertical orientation when on the ground. The internal compartment of the fuselage is configured to rotate to maintain an upright orientation as the fuselage is at its various orientations. These and other unique features of the assembly are discussed below and illustrated in the accompanying drawings.

The assembly will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe an EVTOL aircraft of the present application and its associated features. With reference now to the Figures, an embodiment of the valve assembly and method of use are herein described. It should be noted that the articles "a", "an", and "the", as used in this specification, include plural referents unless the content clearly dictates otherwise.

Referring now to FIGS. 1-4 in the drawings, an EVTOL aircraft 101 is illustrated. In the various figures provided in this application assorted views are provided to assist in understanding the wing spacing, design, and overall orientations of aircraft 101. Additionally, the multiple positions of the internal compartment and the user therein are shown as an example of the degrees of movement possible. Aircraft 101 is shown predominantly in a vertical orientation as seen in FIG. 1. This orientation is used for both vertical landings and take-offs.

It should be understood that aircraft 101 is an electric vertical take-off and landing (EVTOL) vehicle capable of transporting a single person or multiple people. Various speeds are obtainable depending on flight conditions and location. It is conceived that aircraft 101 may reach speeds upwards of 150 mph and travel distances of 100 miles or more. The unique capabilities of aircraft 101 permit it to take-off and land in a vertical orientation. Once airborne, aircraft 101 may transition to a forward flight in a horizontal orientation. Transitioning between the horizontal and vertical orientations while airborne are possible.

The propulsion units are fixed on the respective wings/canards. The wings and canards are generally fixed in relation to the fuselage as well. This allows for simplistic and minimized complexities with respect to the mechanical and electrical operations. Cost is therefore reduced to operate and build.

As seen in FIGS. 1 and 2, aircraft 101 is shown in a vertical landed orientation. Aircraft 101 includes a fuselage 103, an internal compartment 105, a canard 107, a pair of wings 109, and propulsion units 111. A user is able to ride within internal compartment 105 and the orientation or position of the user may be selectively rotated relative to fuselage 103.

Aircraft 101 includes "wings" mounted in three different positions on the fuselage 103, namely fore mounted, mid mounted, and aft mounted. Canards 107 are fore mounted with two pairs of wings 109, one pair being mid mounted 109a and one pair being aft mounted 109b. The three surface configuration minimizes wingspan and non lift extensions. Furthermore, the wings 109/107 and propulsion units 111 are maximally distributed horizontally and vertically from the center of gravity (CG) and fuselage 103. The fore and mid wing placement conforms with the common airfoil shaped fuselage while the mid and aft wings 109 are anhedral and dihedral equally distanced from the center of gravity. More than half the lifting surface area is aft of the center of gravity of the aircraft. It is understood that any number of combinations and profiles for wings 109/107 are possible. Additionally, although canards 107 are called out herein separately from that of wings 109, canards 107 are in fact a wing specifically located fore of internal compartment 105.

It is further noted that the term "wings" may be used to designate the extension of a wing across both sides of fuselage 103 and/or to only the extension of a wing on one side only of fuselage 103. Therefore a pair of wings may include both wings 109a and 109b, or wings 109a extending on both sides of fuselage 103 for example. As terminology may differ in some uses, it was worth noting that the terms herein may be applied to either method of use.

It is understood that the internal compartment is ideally suited for the transportation of a person and/or object such as a package. The volume size of compartment 105 may be smaller than depicted. Usage of compartment 105 affects the CG location of aircraft 101. Some of the key aspects of aircraft 101 involves the locations of propulsion units 111 relative to the CG as will be described herein. It is conceivable that compartment 105 may not even be used or included in aircraft 101 in some embodiments, wherein the special relationships between units 111 and the CG would still be applicable as they have a direct affect toward the flight handling characteristics of aircraft 101. Compartment 105 may affect the location of the CG but its location in aircraft 101, when used, may be located in fuselage 103 so as to minimize any changes, if any at all, to the location of the CG for aircraft 101.

Also seen in FIG. 1 is the use of a landing foot 113 configured to selectively rotate and pivot fuselage 103 between vertical and horizontal orientations. Foot 113 is pivotally coupled to a rear portion of fuselage 103. One or more actuators 115 may be used to induce rotation. In operation, foot 113 rotates away from fuselage 103 at a distal end and contacts the landing surface. Actuators 115 either apply or remove a force to adjust rotation of the aircraft 101. Foot 113 is ideally nestled within fuselage 103 so as to avoid additional drag during flight.

Figure 3:
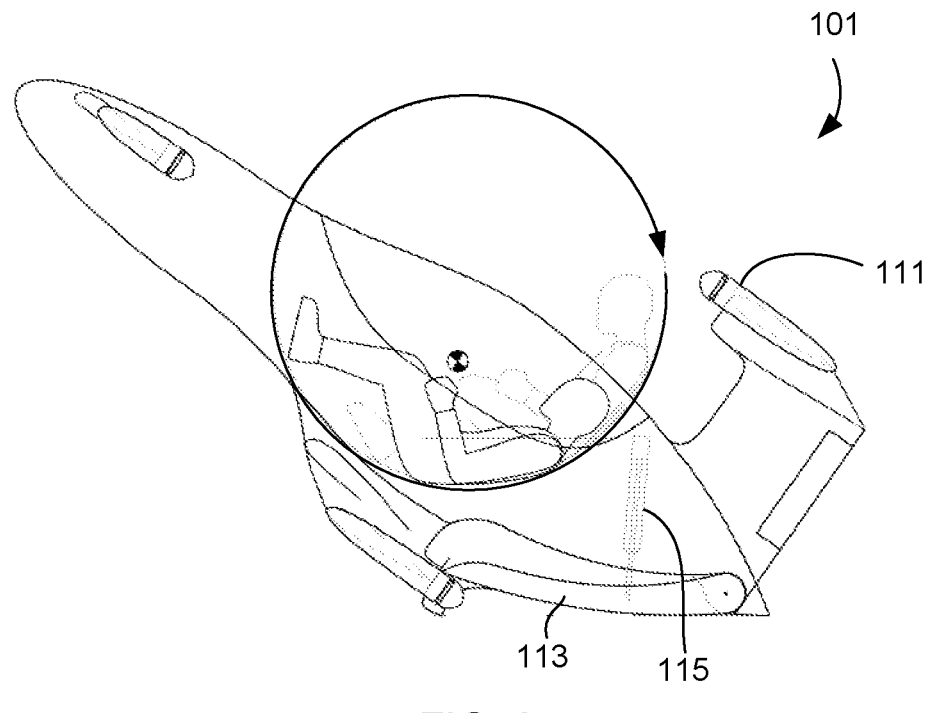
FIG. 3 is a side view of the EVTOL aircraft of FIG. 1 with a landing foot retracted.

FIG. 3 also shows landing foot 113 partially separated from fuselage 103. Propellers are removed from units 111 in this view for clarity. Internal compartment 105 is shown in two orientations. In faded line-weight, an alternate orientation of the user is shown. The arrow around the user denotes possible rotation directions. This same technique is used in other figures to show rotations and directions of possible movements.

Figure 4:
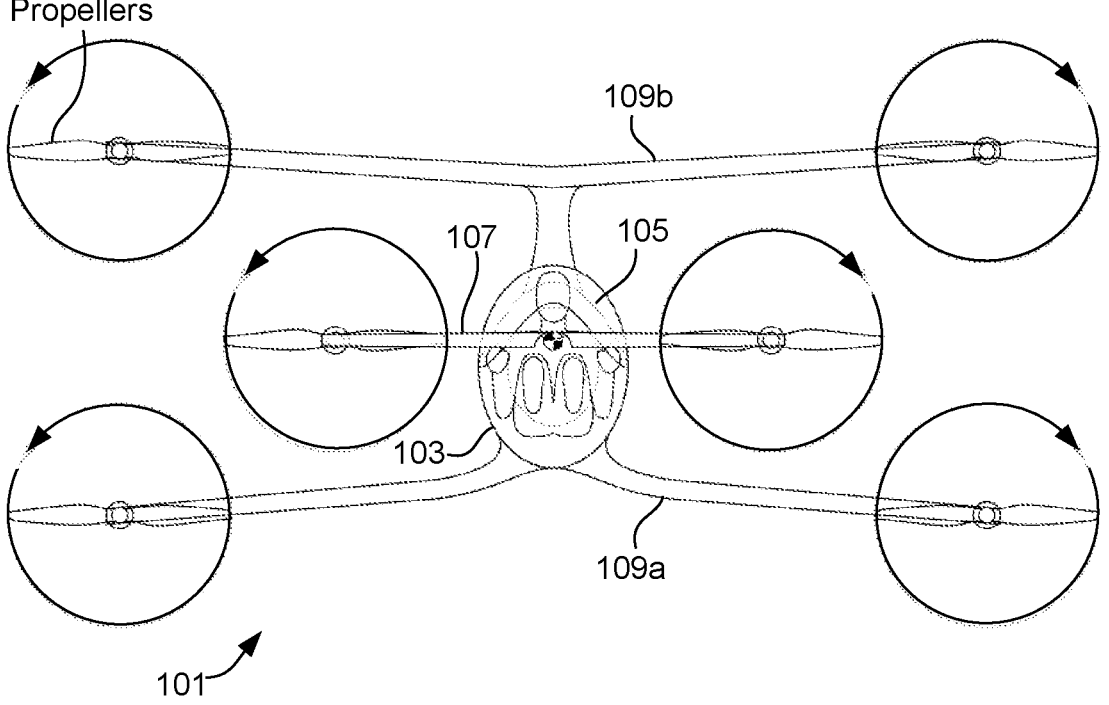
FIG. 4 is a front view of the EVTOL aircraft of FIG. 1.

In FIG. 4, a front view of aircraft 101 is shown. A profile of wings 109 and canards 107 and its respective elevation along aircraft 101 are seen. Likewise, propeller rotation directions at the wing tips are inboard up (counter to tip vortices) which reduces drag and increases lift. Fore propeller rotation may be reversed (inboard down) in order to prevent drift during hover. May cause aircraft to tilt during hover. Additionally, as seen more clearly in FIG. 2, the mid and fore propulsion units 111 are mounted aft of the wings 109/107 to enable folding propeller units which can be retracted into the wings for flight to minimize drag and unnecessary propulsion.

The fore propeller size with canards 107 may be increased in order to reduce the size of the mid and aft mounted wings. Since the fore mounted wings will be mainly used in hover and optionally folded during flight, overall efficiencies will improve.

Figures 5A, 5B, 5C:
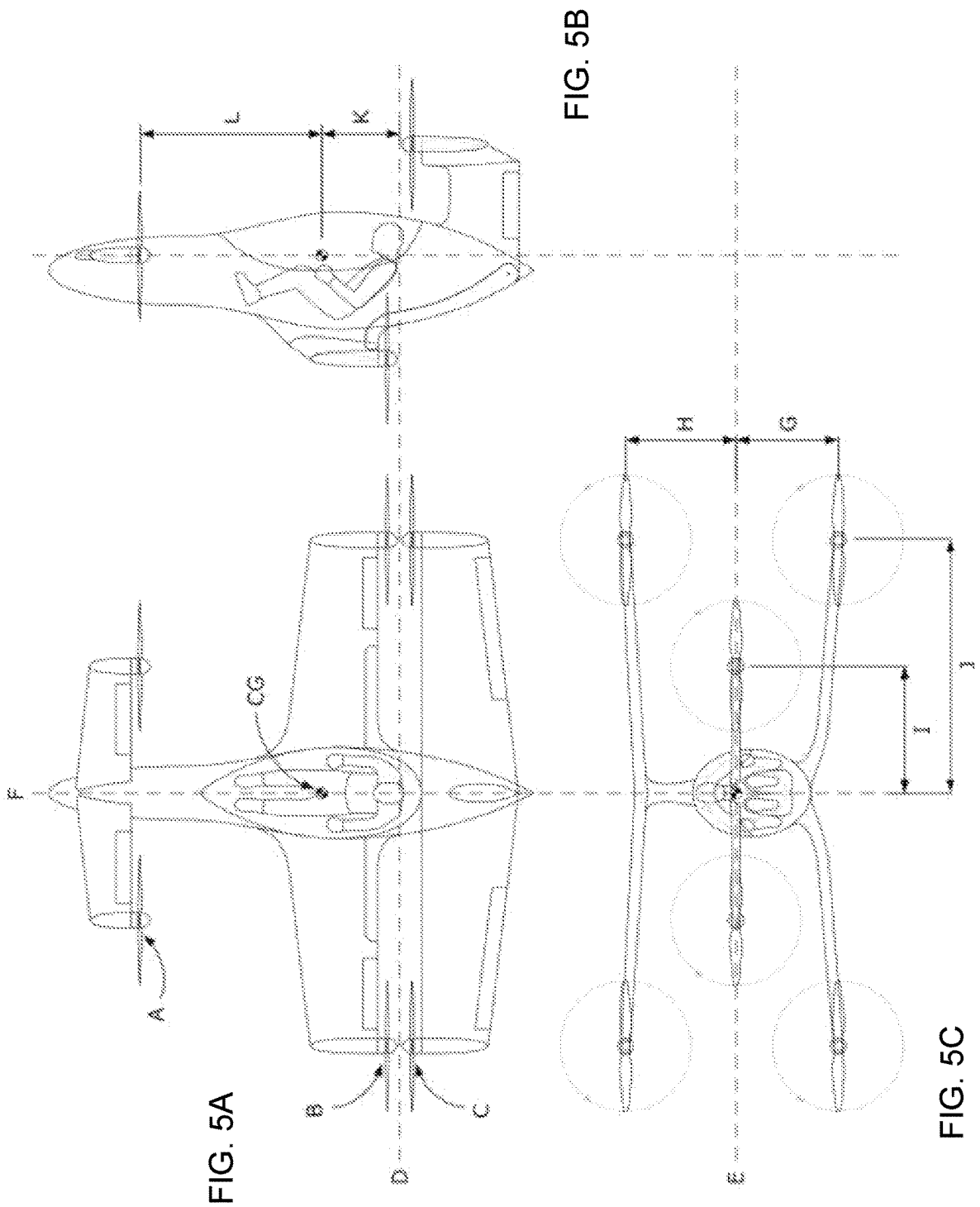
FIGS. 5A-5C are views of the EVTOL aircraft of FIG. 1 showing relative locations of propulsion units to a center of gravity.

Referring now to FIGS. 5A-5C in the drawings, charts of the propulsion unit 111 locations relative to the center of gravity are shown on aircraft 101. These locations are uniquely located to enable controlled vertical hover and horizontal flight of aircraft 101. Each wing 109 and canard 107 includes a propulsion unit 111. Units 111 are positioned at or near these wings, both above and below the center of gravity. Units 111 produce a force vector significantly higher and more centralized than other sources. The spacing of such units 111 also help to create a pendulum effect for stable hover conditions. Benefits are realized by locating units 111 near the distal portions of wings 109/107. All wingtips (distal ends of wings 109/107) have units 111. The locations of wings 109/107 and units 111 work together to fulfill multiple core criteria. Namely, in hover mode, the lift is evenly distributed. In horizontal flight, this minimizes turbulent interference (i.e. downwash) which in turn increases efficiency. Once landed, it enables access to internal compartment 105 in both the vertical and horizontal orientations.

Due to the distributed thrust placement with mid and aft propeller units near the center of gravity, there is a possibility that flight control surfaces (ailerons, elevators, rudders) may be removed or minimized which would drastically simplify the design, reduce cost/weight and improve efficiency and safety.

As seen in FIG. 5A, propulsion on mid and aft wings 109a/109b, at B and C, are nearly planar along line D. Aft wing 109b is lower than D while mid wing 109a is higher than D. Line D is lower than the CG as seen in the top and side views. Units 111 of wings 107, at A, are higher than CG. With respect to FIG. 5B, the distance from A to CG (L) is significantly larger than distance from D to CG (K). As seen with FIG. 5C, propulsion on wings 107, at A, are in line with CG denoted by line E. It is worth noting that B and C are placed at nearly the same distances from CG (G and H) above and below. Distance from B and C to CG (J) is significantly larger than distance from A to CG (I).

Referring now to FIGS. 6-8 in the drawings, views of an alternate form of entry/exit from internal compartment 105 is shown. Aircraft 201, 221 and 241 are similar in form and function to that of aircraft 101. These embodiments are to show alternate forms of access and the use of different types of doors 117a-d. Access into compartment 105 may be done in various different manners. Aircraft 101 may include an auxiliary door 117a-117d in communication with a portion of fuselage 103. Auxiliary door 117a-d is configured to selectively open and close so as to expose an opening to allow entry/exit. It is desired that the operation of door 117a-d be limited to grounded conditions and not when airborne. Vertical entry/exit may be accomplished through door 117a-d in the bottom or side of aircraft 101 as shown in these figures. As seen in FIG. 6 in particular with aircraft 201, a user may rotate in compartment 105 downwards to align their feet closer to the ground. Aircraft 201 uses door 117d to pivot downward to allow the user to exit or enter. Door 117d is coupled to a portion of fuselage 103 and rests upon landing foot 113 when lowered.

In some embodiments a user may enter when prostrate or standing. This is ideal for vertical take-off or laying down during horizontal take-off conditions. Naturally, wing 109/107 locations may be modified to assist in access safely. With respect to FIG. 7 and aircraft 221, an upper door 117c is illustrated wherein a user uses a portion of landing foot 113 similar to the door above. Likewise with FIG. 8 and aircraft 241, upper and lower doors 117a-117b are used separate from foot 113 and open to a side of fuselage 103. In these configurations, due to additional hatch and opening, modifications to mid wing connections and landing foot 113 would be necessary as this may affect the structural integrity of fuselage 103. Material thicknesses may be adjusted to add structure but may affect overall weight and flight performances. The landing foot 113 may be used to partially conceal the opening of compartment 105 via actuation of its position.

Figures 9, 10, 11, 12:
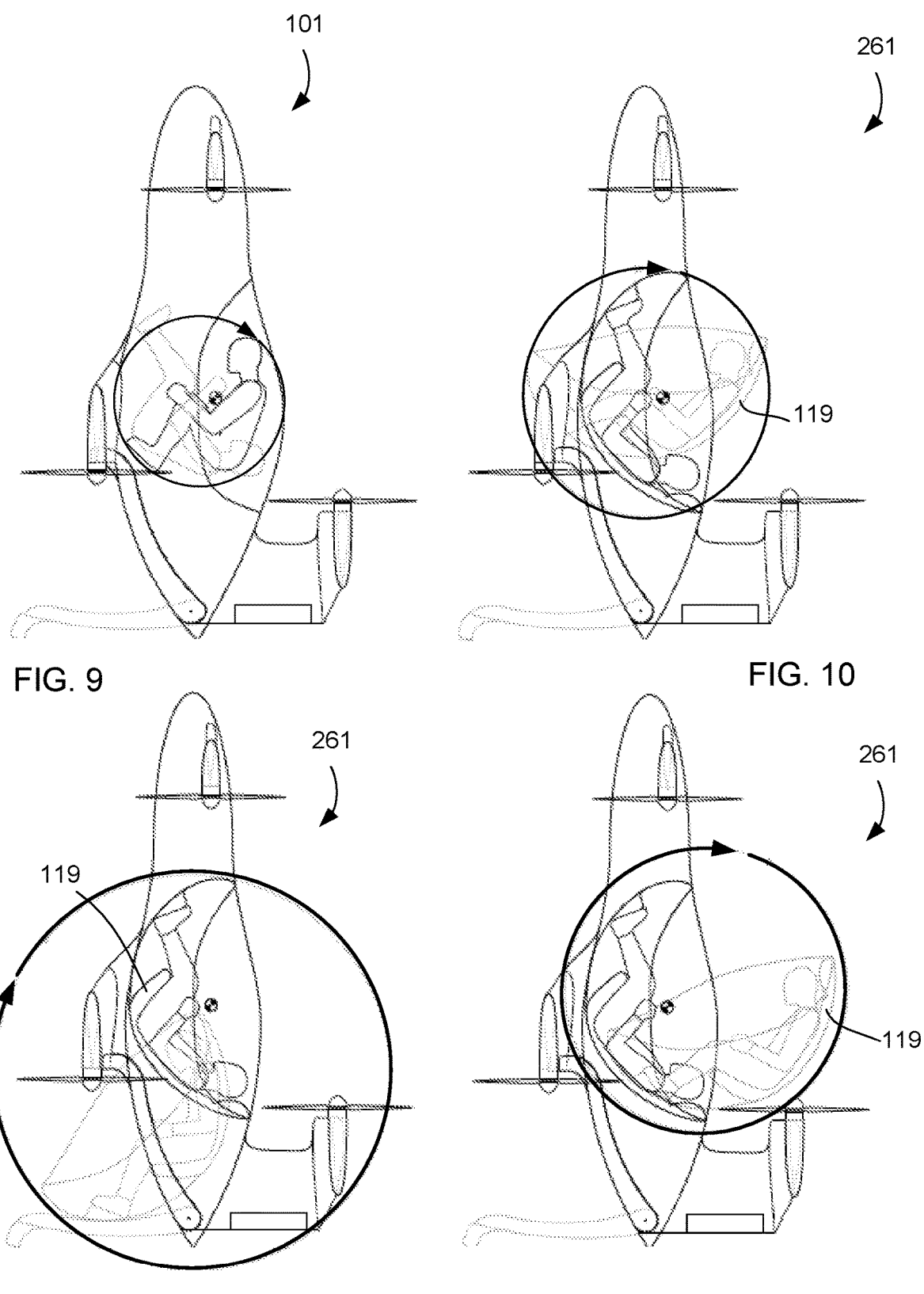
FIGS. 9-12 are views of the EVTOL aircraft of FIG. 1 illustrating various internal compartment orientations.

Referring now also to FIGS. 9-12 in the drawings, the operation of a seat within compartment 105 is illustrated. In these figures, the orientations or operation of the user in compartment 105 is provided. A seat assembly 119 is shown in more detail with respect to aircraft 261 in FIGS. 10-12. FIG. 9 illustrates the rotation of the occupant in aircraft 101. Aircraft 261 is similar in form and function to that of aircraft 101 but is used to show more detail with seat assembly 119. Compartment 105 may include seat assembly 119 which can be used to define a cockpit. This may turn a full 90 degrees such that the user is kept level during transition in orientations of the aircraft between horizontal and vertical. This helps to provide additional comfort to the user. Naturally the inclusion of rotating cockpits may introduce additional weight and size in fuselage 103, however, such may be preferred when removal of the cockpit or just the passenger is desired. If the opening is large enough, the entire cockpit may be removed (see FIGS. 11-12).

Referring now also to FIGS. 13-31 in the drawings, alternate wing locations and characteristics are provided for aircraft disclosed herein. Each of aircraft 101, 201, 221, 241, and 261 may be modified to include these optional features herein described in these Figures. A different numerical callout will be provided for each wing configuration but it is understood that each aircraft is similar in form and function to any and all of the prior described aircraft embodiments.

In FIG. 13, aircraft 271 utilizes a mid wing positioned on top of the fuselage 103 and the aft wing may be positioned lower at the tail of fuselage 103. This is flipping the placement as seen with aircraft 101. In this arrangement, landing foot 113 would be located on top and may be useful to simplify bottom entry from FIGS. 6-12.

With respect to FIG. 14, aircraft 281 can shift the center of gravity to the center of fuselage 103 to provide more efficient and stable flight. This may necessitate additional non-lift extensions and may also act to complicate landing foot 113 operation and connection to fuselage 103. In this figure, the mid wing is modified away from fuselage 103.

Concerning FIGS. 15 and 16, aircraft 291 has the aft wing tips extended downward (vertically) so as to be used for landing points perhaps (optionally). Landing foot 113 would only need one extension instead of being integrated into the wing as seen previously with the other aircraft described. Locating weight of the aircraft onto the wings during landing may necessitate additional strength in the aft wings to prevent damage. This may result in decreased performance and/or aesthetics. Location of unit 111 in relation to the aft wing leading edge may also be modified as a result. In general, modification to the wing tip locations may have some influence on the capabilities and efficiencies of the aircraft.

Figures 17, 18:
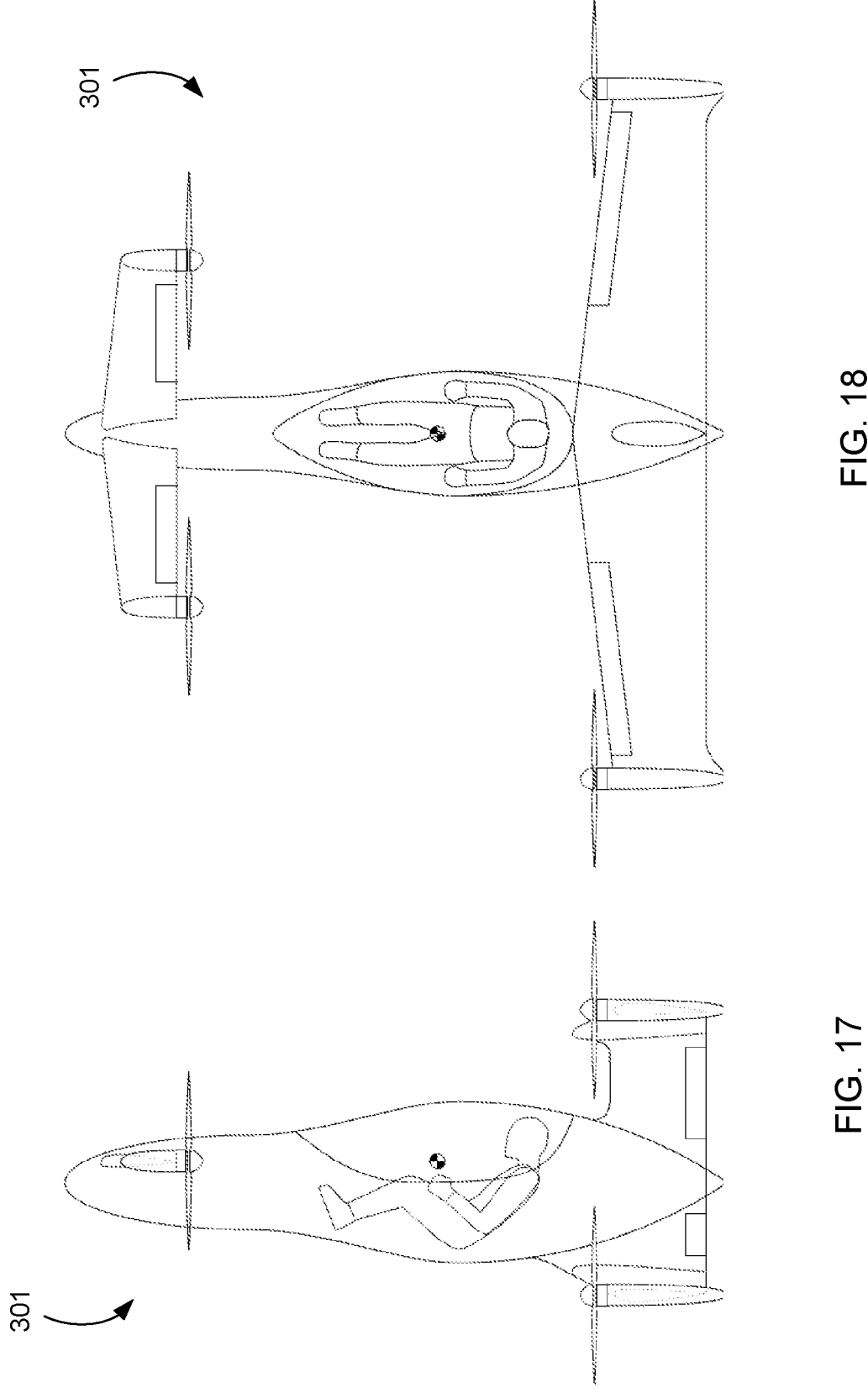

Concerning FIGS. 17-18, aircraft 301 is using a front canard 107 and the mid mount wings 109a are moved to be inline with aft mount wings 109b. Mid and aft wings can be positioned one above the other at the rear similar to a conventional bi-plane concept. Wherein using wingtips as part of the landing gear, this would perhaps eliminate the need for actuated landing foot 113, like unto a tail sitter aircraft. Minimized weight and more simplistic design would be an obvious benefit. However, this would decrease efficiency and overall lift thereby requiring larger wings. It may in fact complicate lift and weight distribution and create instability.

With respect to FIGS. 19-22 aircraft 101 may be modified to utilize non lift structures that extend between wings and/or fuselage 103. FIGS. 19-20 show views of non lift structures 312 that extend between aft and mid mount wings 109a-109b. In FIGS. 21-22 non lift structures 322 extend between a wing and fuselage 103 in aircraft 321.

Figure 23:
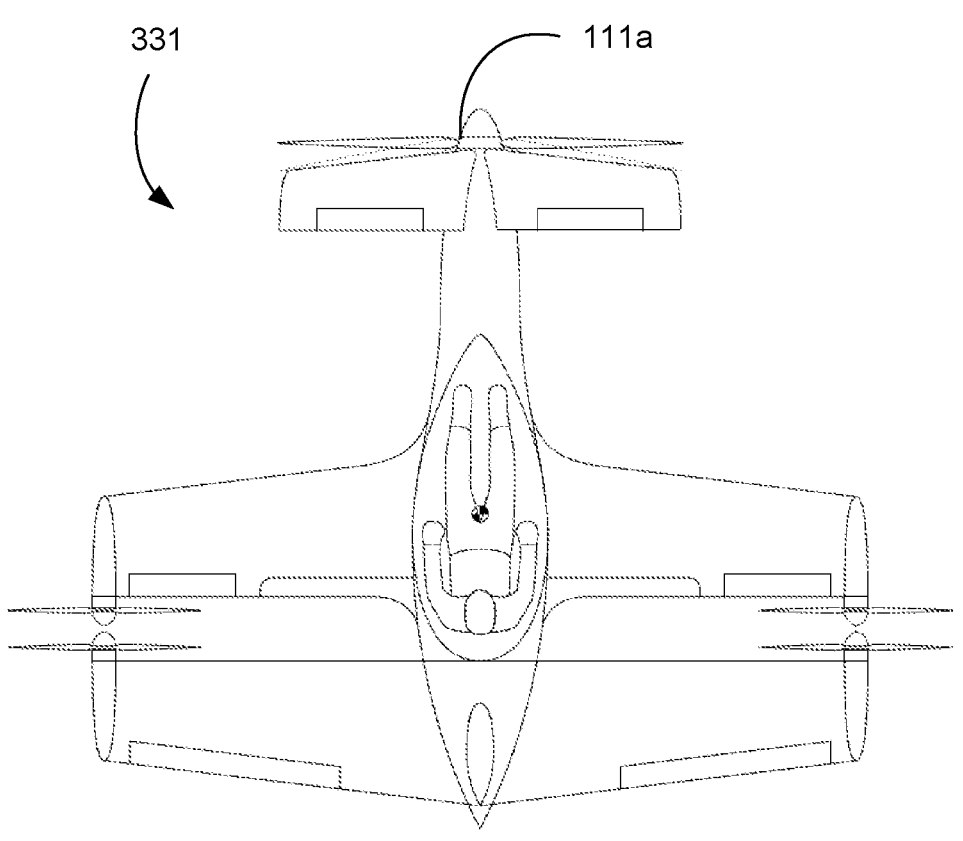
Figure 24:
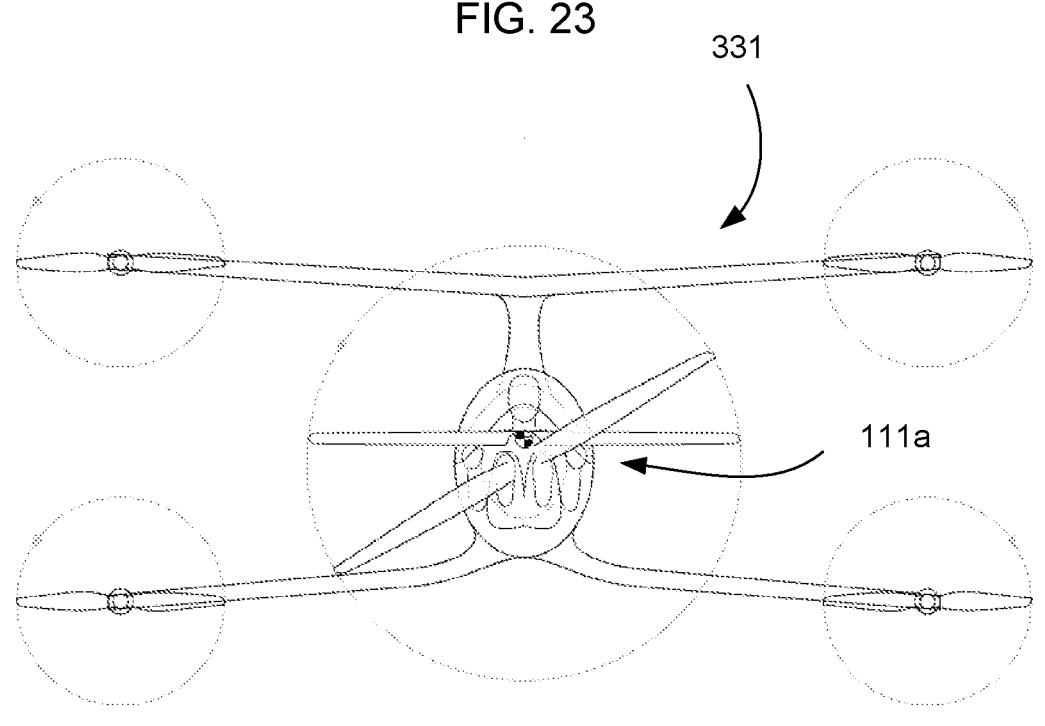

FIGS. 23-24 show aircraft 331 wherein in large single propulsion unit 111a is used up front of the fuselage in front of the canards (i.e. in the nose of the fuselage). In this embodiment, the canards themselves do not have a unit 111 attached. The propellors of unit 111a may be aligned with and fold back to conform to the canard profile during flight. Alternatively, unit 111a may have contra rotating propellers.

Figure 25:
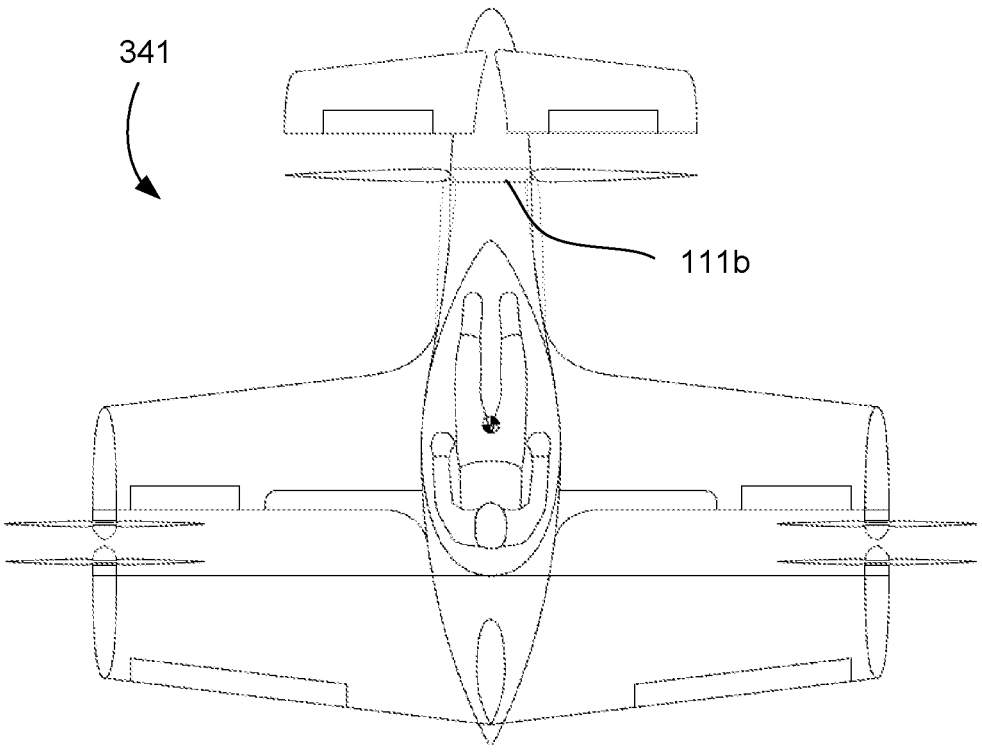
Figure 26:
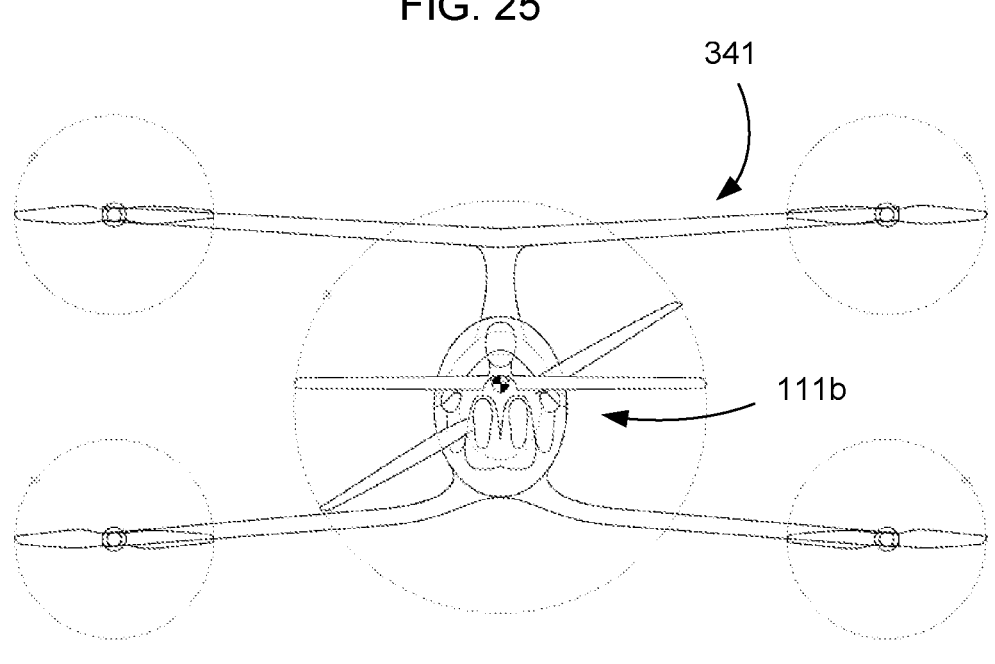

With respect to FIGS. 25-26, aircraft 341 is shown wherein the large single propulsion unit 111b is located centrally between the canard and mid mounted wings. Much like with aircraft 331 the canards themselves do not have a unit 111 attached. The propellors of unit 111b may be aligned with and fold back to conform to the profile of the fuselage during flight. Alternatively, unit 111b may have contra rotating propellers. This location of unit 111b would provide more lift during hover and be quieter. Although, some disadvantages may include more complexity during manufacture and increased costs having to use potentially more non-standard parts. Additionally, to ensure enough distance between compartment 105 and unit 111b, a longer fuselage is optionally needed.

Figures 27, 28:
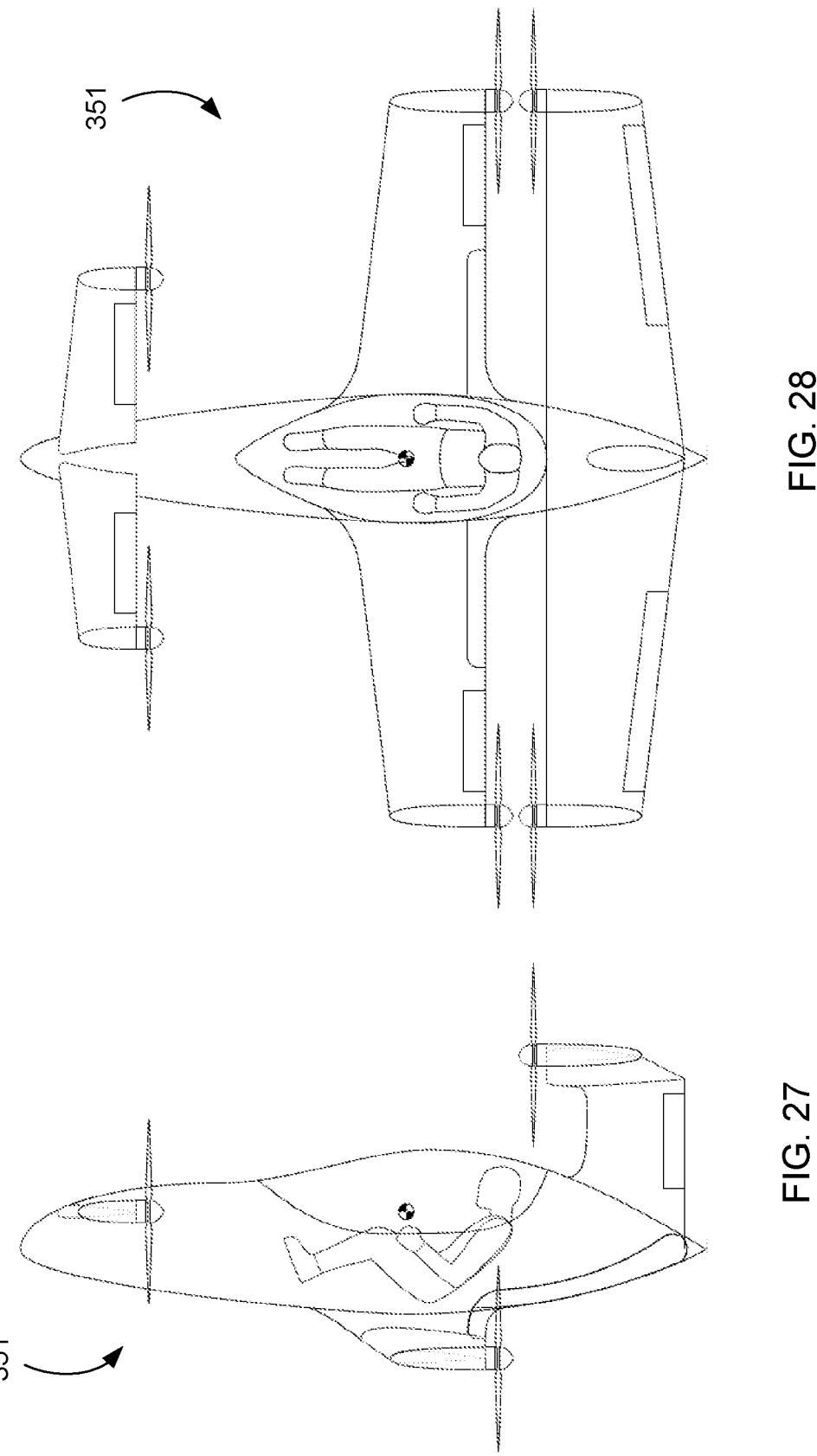

FIGS. 27-28 illustrate aircraft 351 wherein the fuselage is shaped to be modified to have less surface area on the bottom, meaning more on top of the centerline similar to typical airfoil design. Improved lift and reduced aesthetics may result.

Figures 29, 30:
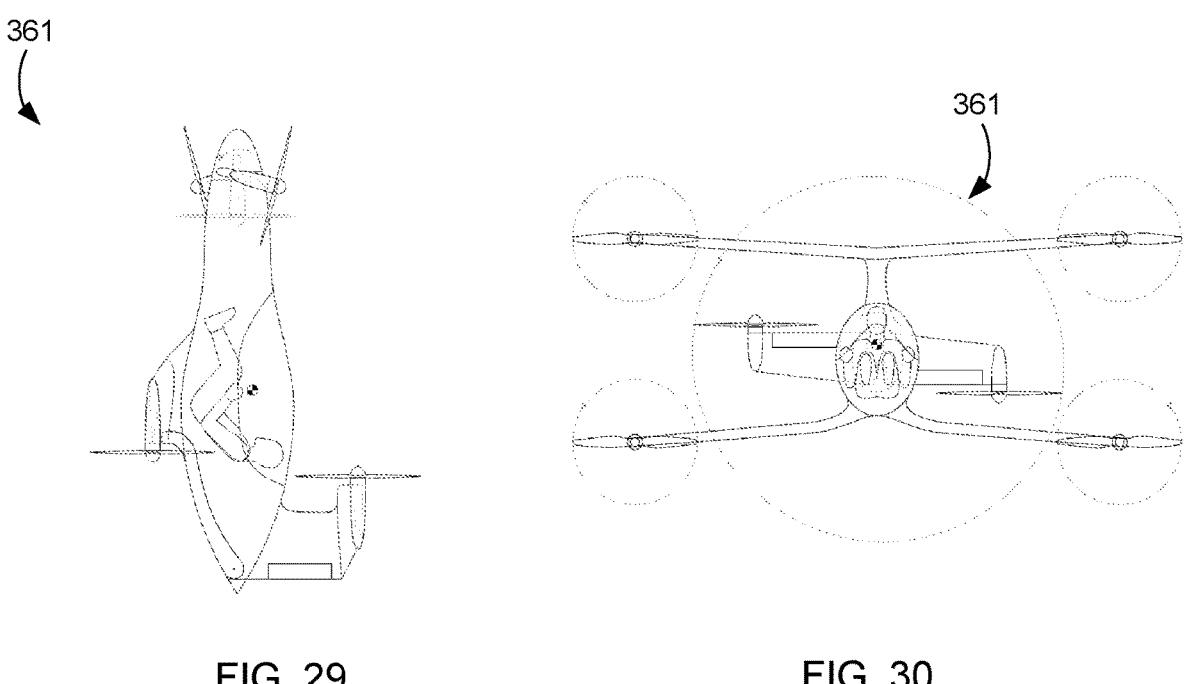

Concerning FIGS. 29-30 aircraft 361 is configured to permit rotatable canards 107a. The entire canard 107a with unit 111 may rotate so as to be used as a prop for hover as well as control surface for flight via use of a swashplate. A single drive motor may be used to regulate operation of the rotating canards 107a. The propellors may be at the wing tips. Counter rotation measures may be necessary using tilting of control surfaces behind other units 111 on the wings. The complexity of this wing embodiment drastically increases with wing rotation.

Figure 31:
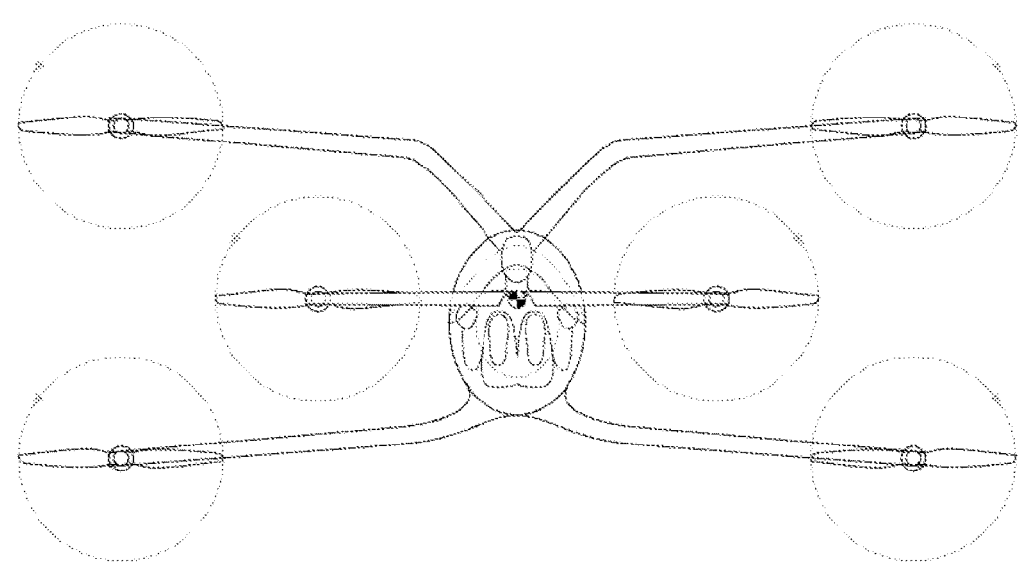

Finally, as seen in FIG. 31, an aircraft 371 may use a different wing profile. The wing profiles of canard 107 and wings 109 may have many different shapes, as seen from a top view or through a front view of the aircraft. FIG. 31 shows aircraft 371 which includes a wing 109b having a split v design. Wing extensions in this embodiment may be useful to improve efficiency with less wetted surface but may decrease overall lift of the upper wing and increase overall complexity of the aircraft.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An electric vertical take-off and landing aircraft, comprising:
   a fuselage;
   a canard located at a forward portion of the fuselage; and
   a pair of wings extending outward from the fuselage, each of the pair of wings contains a propulsion unit configured to provide thrust, each propulsion unit is in fixed orientation to the fuselage and the pair of wings and is specifically positioned to enable controlled vertical hover and horizontal flight;
   an internal compartment in the fuselage;
   wherein the propulsion units are located at the tip of the pair of wings to permit access into and out of the internal compartment in both a vertical orientation and a horizontal orientation.

2. The aircraft of claim 1, wherein the internal compartment is configured to rotate to maintain an upright orientation as the fuselage is rotated.

3. The aircraft of claim 1, wherein the internal compartment includes an opening to permit access into and out of the internal compartment when the fuselage is in either of a horizontal or vertical orientation.

4. The aircraft of claim 1, further comprising:

an auxiliary door in communication with an opening in the internal compartment.

5. The aircraft of claim 4, wherein the opening of the internal compartment is at least partially concealed by actuation of a landing foot.

6. The aircraft of claim 1, wherein the propulsion units are positioned on the pair of wings above and centered on the center of gravity.

7. The aircraft of claim 1, wherein the canard and pair of wings produce a three surface configuration that minimizes wingspan.

8. The aircraft of claim 1, wherein a take-off and landing orientation is a vertical orientation.

9. The aircraft of claim 1, wherein the canard and pair of wings are maximally distributed horizontally and vertically.

10. The aircraft of claim 9, wherein the pair of wings are separated to be located with one pair of wings as mid mounted wings on the fuselage and a second pair of wings as aft pair of wings on the fuselage, the mid mounted wings being anhedral and the aft pair of wings being dihedral equally distanced from the center of gravity of the aircraft.

11. The aircraft of claim 1, wherein the pair of wings are separated to be located with one pair of wings as mid mounted wings on the fuselage and a second pair of wings as aft pair of wings on the fuselage, the mid and aft mounted propulsion units are positioned nearly planar to one another which reduces turbulent interference.

12. The aircraft of claim 1, wherein the propulsion units include propellers, the propeller rotation directions are inboard up which reduces drag and increases lift.

13. The aircraft of claim 1, wherein at least one pair of wings are mounted mid fuselage, the mid mounted pair of wings and the canards have propulsion units, these propulsion units being mounted aft of the wings and canards to enable and include folding propellers which can be retracted into the pair of wings and canards.

14. The aircraft of claim 1, wherein more than half the lifting surface area is aft a center of gravity of the aircraft.

15. The aircraft of claim 1, further comprising:

a landing foot configured to rotate the fuselage into and out of a vertical orientation when on the ground.

16. The aircraft of claim 15, further comprising:

an actuator to operate the landing foot.

17. The aircraft of claim 15, wherein the landing foot is integrated into at least one of the pair of wings.

18. An electric vertical take-off and landing aircraft, comprising:

a fuselage containing an internal compartment;

a canard located at a forward portion of the fuselage;

a pair of wings extending outward from the fuselage, each of the pair of wings contains a propulsion unit configured to provide thrust, each propulsion unit is in fixed orientation to the fuselage and the pair of wings; and a landing foot configured to rotate the fuselage into and out of a vertical orientation when on the ground;

wherein the internal compartment of the fuselage is configured to rotate to maintain an upright orientation as the fuselage is rotated;

wherein the propulsion units are located at the tip of the pair of wings to permit access into and out of the internal compartment in both a vertical orientation and a horizontal orientation.

* * * * *